Patented Mar. 15, 1932

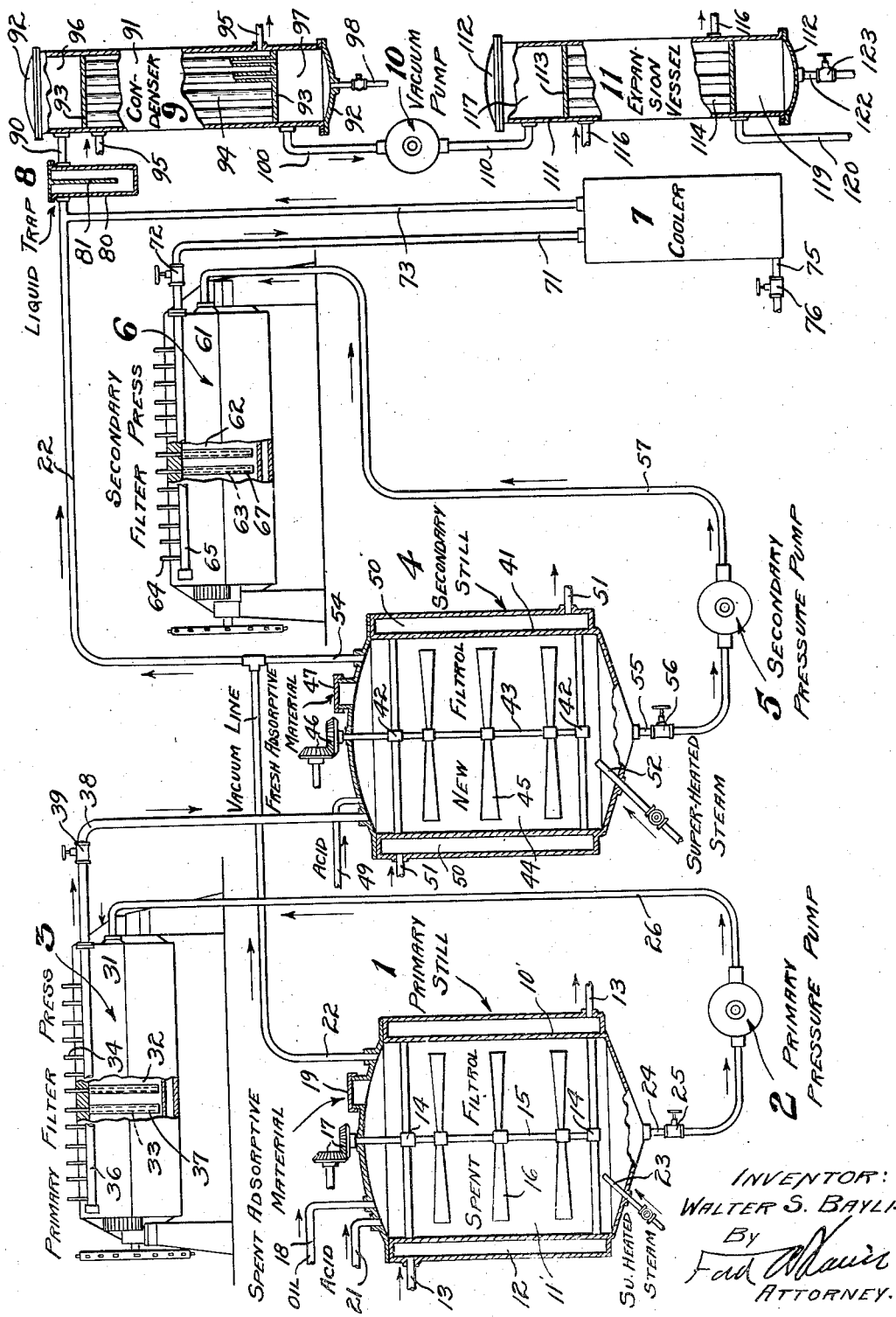

1,849,653

UNITED STATES PATENT OFFICE

WALTER S. BAYLIS, OF LOS ANGELES, CALIFORNIA, ASSIGNOR, BY MESNE ASSIGNMENTS, TO FILTROL COMPANY OF CALIFORNIA, A CORPORATION OF CALIFORNIA

PROCESS OF TREATING PETROLEUM OIL

Application filed October 14, 1926. Serial No. 141,587.

My invention relates in particular to petroleum oil refining processes and it consists in a process that is very valuable for treating oil in the production of lubricating oils. Although my invention may be used in connection with refining of various classes of oil, I shall for the purpose of illustration describe my invention as used for producing lubricating oil.

When crude oil is refined to produce principally lubricating oil, it is usually separated into its various products by fractional distillation or steam reduction so that the "cracking" and decomposition thereof will be kept as low as possible. The distillates, cuts or stocks are derived from the crude oil in the fractional distillation, leaving the cylinder stock from which lubricating oil is usually produced.

Most of the products obtained by the distillation of crude petroleum oil are not in a marketable condition and must be purified or chemically treated to remove resinous matters, hydrocarbons of unsaturated and aromatic groups and other impurities which give the products dark colors and unpleasant odors. It is general practice to purify such products by subjecting them to the action of sulphuric acid and afterwards to the sodium hydroxide or caustic soda which completes the purification of the oil and neutralizes any remaining sulphuric acid. The purifying processes of this category have certain disadvantages. For instance, considerable acid sludge is formed, ranging from 5% to 30% in volume of the oil which is an appreciable loss. Also, this sludge must be separated and this separation takes considerable time.

It is an object of this invention to provide a process of purifying oil which is superior to other processes since it is more rapid in treating the oil, does not have an appreciable waste and does not require expensive equipment.

Another object of my invention is to provide the process of treating oil in which the oil is freed of light fractions and decolorized at the same time.

I have found that oil may be purified by mixing it with an adsorptive material which adsorbs all the impurities from the oil. This adsorptive material is subsequently filtered from the oil, thus leaving the oil free from impurities. Acid treated clay is very suitable for use as an adsorptive material and I desire to use this in my process.

It is, accordingly, an object of this invention to provide a process of treating petroleum oil which involves the separation of impurities from the oil by use of an adsorptive material.

It is a further object of this invention to provide a process of treating petroleum oil which includes the mixing of oil with an adsorptive material and simultaneously subjecting the mixture to the action of a hot vapor, such as steam, for the purpose of distillation and refining.

It is an object of this invention to provide a process of the character which ordinarily requires no acid treatment of the oil.

On some grades of oil I have found it desirable to use a very small percentage of acid for expediting the purification of the oil. The acid is adsorbed by the adsorptive material and there is therefore no sludge and there is not required a later treatment to neutralize the oil.

It is, therefore, another object of this invention to provide a process of treating petroleum oil which involves the mixing of oil with an adsorptive material and a small percentage of acid, which acid is adsorbed by the adsorptive material, leaving the oil in a neutral condition.

It is a still further object of this invention to provide a process of treating petroleum oil of the character mentioned which is carried on in the presence of a high vacuum.

Other objects and advantages of the invention will be made evident hereinafter.

The drawing is a diagrammatic sketch, partly in cross-section, of an apparatus suitable for carrying out the process.

With reference to the drawing in which is illustrated one form of apparatus for conducting my invention, 1 is a primary still, 2 is a primary pressure pump, 3 is a primary filter press, 4 is a secondary still, 5 is a secondary pressure pump, 6 is a secondary filter press, 7 is a cooler, 8 is a liquid trap, 9 is a condenser, 10 is a vacuum pump and 11 is an expansion vessel.

The still 1 consists of a shell 10' providing a closed chamber 11' which is surrounded by a heating chamber 12 which may be supplied with a heating medium such as steam for heating the chamber 11', this heating medium being supplied to and taken from the heating chamber 12 through pipes 13. Bearings 14 rotatably support a shaft 15 in the chamber 11' to which shaft 15 are rigidly secured mixing paddles 16. The shaft 15 is adapted to be rotated by means of gearing 17 which is provided at an upper end of the shaft 15 which extends to the exterior of the shell 10'.

Oil to be refined and purified is introduced into the mixing chamber 11' of the still 1 through a pipe 18. In this embodiment of my invention the oil introduced into the pipe 18 is to be converted largely into lubricating oil. It should be clearly understood, however, that I may treat various kinds of oil by my process and produce various characters of products. Adsorptive material is introduced into the mixing chamber 11' through an opening in the shell 10' which is closed by a tight cover 19. I prefer to use an adsorptive material in the form of an acid treated clay such as that known in the art as Filtrol. Also, I prefer to use a spent adsorptive material, that is, an adsorptive material which has been used once in the secondary still 4. This will be explained later. It may be desirable when treating certain classes of oils to introduce a very small percentage of acid such as sulphuric acid into the chamber 11'. This acid may be introduced through an acid line 21.

The oil, spent adsorptive material and acid, if it is used, are thoroughly mixed in the still 1 by the action of the mixing paddles 16. The chamber 11' of the still 1 is heated to a temperature of around 212 degrees by steam introduced into the heating chamber 12. The oil when introduced into the still 1 is impregnated with impurities such as resinous matters, hydrocarbons of unsaturated and aromatic groups and other impurities which must be removed therefrom in order to render the oil ready for market. During the mixing action in the still 1, most of the impurities and the acid are adsorbed from the oil by the spent adsorptive material.

The interior of the still 1 is placed under a high vacuum through a vacuum line 22 which connects with the still 1 and which connects with the vacuum pump 10 in a manner which will be described hereinafter. During the mixing of the oil, Filtrol and acid, a hot vapor preferably in the form of hot steam is passed through the mixture, this steam being introduced into the mixing chamber 11' by means of a steam pipe 23. This steam raises the temperature of the mixture sufficiently to distill a great portion of the lighter constituents of the oil from the mixture. The vapors carrying the vaporized constituents are drawn from the still 1, through the vacuum line 22. When this operation has been carried on for a proper length of time the operation of the mixing paddles 16 is arrested and the superheated steam is shut off.

The mixture is then pumped to the primary filter press. A pipe 24 having a valve 25 connects to the mixing chamber 11' through the bottom of the shell 10' and extends to the primary pressure pump 2. A pipe 26 extends from the primary pressure pump 2 to the primary filter press 3. The valve 25 is opened and the primary pressure pump 2 is set into operation and the mixture in the still 1 is pumped through the primary filter press 3.

This primary filter press 3 is of standard construction and consists of a shell 31 providing a filter chamber 32. A multiplicity of filter bags 33 are situated in the filter chamber 32. Pipes 34 are connected to the interior of the filter bags 33, extending to the exterior of the shell 31 and connecting with a header 36. The oil passes through the walls of the filter bags 33 to the interior thereof and through the pipes 34 into the header 36. The filter bags 33 are of comparatively fine mesh which is too small for the spent adsorptive material to pass through. Therefore, this adsorptive material which carries impurities and acid collects in cakes on the bags 33, as indicated at 37. The oil as it passes from the primary filter press 3 is in an almost entirely refined condition and has substantially all of the impurities removed therefrom.

The filtered oil is passed from the primary filter press 3 to the secondary still 4 by means of a pipe 38 having a valve 39 which pipe 38 connects to the header 36 of the primary filter press 3 and with the top of the shell 41 of the secondary still 4.

The secondary still 4 is composed of the shell 41 which is air-tight. Bearings 42 rotatably support a shaft 43 in a mixing chamber 44 of the shell 41, which shaft 43 has mixing paddles 45 rigidly secured thereto. Gears 46 are situated at the upper end of the shaft 43 which extends from the shell 41 whereby the shaft 43 is rotated and the mixing paddles 45 are operated. Fresh adsorptive material is introduced into the mixing chamber 44 of the secondary still 4 through an opening which is closed by a tight cover 47. The mixing paddles 45 are then set into operation and the fresh adsorptive material, which in this embodiment of my invention is acid treated clay, and the filtered oil are thoroughly mixed together. Acid may be added to this mixture through an acid line 49 which connects to the mixing chamber 44. The mixture in the still 4 may be heated to a suitable temperature somewhere around 212 degrees by a heating medium, preferably steam, which is introduced into and taken from a heating chamber 50 by means of pipes 51. During the mixing of the filtered oil, the fresh adsorptive material and the acid, if acid is used, and the remaining impurities in the filtered oil are adsorbed by the adsorptive material. The acid is also adsorbed by the adsorptive material.

The interior of the still 4 is subjected to a high vacuum by means of a branch line 54 which connects with the vacuum line 22. During the mixing in the still 4 superheated steam may be passed therethrough by means of a superheated steam pipe 52. The superheated steam in passing upward through the mixture distills the lighter constituents therefrom which pass with the steam through the vacuum pipe 54. The steam is passed through the mixture in the secondary still 4 until the oil is reduced to a proper viscosity, it being obvious that the longer the mixture is subjected to the use of the steam, the more viscous it becomes.

After this action in the still 4 the second mixture is pumped into the secondary filter press 6. A pipe 55 connects to the bottom of the shell 41 and to the secondary pressure pump 5, this pipe 55 having a valve 56 which is opened at this time. Extending from the secondary pump 5 to the secondary filter press 6 is a pipe 57. The secondary pump 5 is set into operation and the second mixture is taken from the secondary still 4 and pumped into the filter press 6.

The secondary filter press 6 is of standard construction and may be of the same construction as the primary filter press 3 having a shell 61 which provides a filter chamber 62. Situated in the filter chamber 62 is a multiplicity of filter bags 63, the interiors of which bags have pipes 64 connected therewith. These pipes 64 extend to the exterior of the shell 61 and connect to a header 65. The second mixture is pumped into the filter chamber 62 of the secondary filter press 6 and the filtered oil passes through the walls of the filter bags 63 and through the pipe 64 into the header 65. The mesh of the walls of the filter bags 63 is quite small and therefore the adsorptive material carrying the remaining impurities of the oil and the acid cannot pass therethrough. This adsorptive material collects in cakes on the exterior of the filter bags 63, as indicated at 67. The oil passes from the secondary filter press 6 to the cooler 7 through a pipe 71 which connects with the header 65 and with the cooler 7 which has a valve 72 therein. The oil when it reaches the cooler 7 is in entirely refined condition and is absolutely free from all impurities. Also it is of a proper viscosity due to the fact that it is treated in the secondary still 4 a length of time to obtain the proper viscosity. The interior of the cooler 7 is subjected to vacuum by means of a vacuum pipe 73 which connects with the cooler 7 and with the vacuum line 22.

From the description so far, it is seen that the oil is treated entirely in the presence of a high vacuum and that it is allowed to cool in the presence of a high vacuum. In the case of the treatment of a vegetable or animal oil, the degree of vacuum should be from 27 inches of mercury up to within a few millimeters of the barometer. The higher the degree of vacuum, the better. In the case of difficultly volatile mineral oils, the same conditions are to be observed, but when comparatively easily volatile mineral oils are being treated, the degree of vacuum should be below that as causing the oil to quickly vaporize at the temperature at which it is being treated. By mixing, partially distilling and cooling the oil in the presence of a high vacuum cracking thereof is prevented and therefore undesirable decompositions will not be formed which would give it an unpleasant odor. The cooler 7 may be of any construction and the oil which has been refined and purified is allowed to cool to a normal temperature so that there will be no oxidization thereof. The cooled oil may be withdrawn from the cooler 7 through a pipe 75 having a valve 76.

The superheated steam which passes through the stills 1 and 4 carries the vaporized lighter constituents of the oil therewith. These vapors which consists of steam and vaporized constituents of the oil pass through the vacuum lines 54 and 22 to the liquid trap 8. The liquid trap 8 consists of a shell having a baffle 81 which causes the vapors to pass through a sinuous path so that any liquid particles will be retained in the trap. The pipe 22, as shown, connects with the interior of the shell 80. A pipe 90 is provided for conveying the vapors from the liquid trap 8 to the condenser 9.

The condenser 9 consists of a shell 91 having heads 92. Secured in the shell 91 are intermediate heads 93 between which pipes 94 extend. Cooling liquid is supplied to and withdrawn from the space between the intermediate heads 93 by means of a pipe 95. The pipe 90 conveys the vapors into an upper chamber 96 of the condenser 9. The vapors pass from the upper chamber 96 through the pipes 94 to the condenser 9. In their passage through the condenser constituents of the vapors having a higher boiling point than water are condensed and may be removed from the lower chamber 97 through a pipe 98.

The remaining vapors are conducted from the condenser 9 through a pipe 100 which extends to the vacuum pump 10. This vacuum pump is utilized for placing a vacuum upon the interiors of the primary and secondary stills 1 and 4 and on the cooler 7 and also for drawing the steam vapors and oil vapors through the apparatus. The vapors are forced by the vacuum pump 10 through a pipe 110 to an expansion vessel 11.

The expansion vessel 11 consists of a shell 111 having tight ends 112 and intermediate heads 113 between which intermediate pipes 114 extend. A cooling medium is supplied to and taken from the space between the intermediate heads 113 and around the pipe 114 by means of pipes 116. The vapor is passed by the pipe 110 into an upper chamber 117 of the expansion vessel 11 and passes therefrom through the pipes 114 to a lower chamber 119. All of the condensable portions of the vapor are condensed in the expansion vessel 11, the fixed gases being withdrawn from the expansion vessel 11 through a fixed gas pipe 120 which connects with the lower chamber 119.

The condensates of the vapor are withdrawn from the lower chamber 119 through a pipe 122 having a valve 123. These condensates consist essentially of impurities which are of a very small percentage of water and distillates or cuts of the petroleum oil. The distillates or cuts are separated from the water and impurities and thereby rendered ready for the market.

From the foregoing description it will be seen that the process of my invention refines petroleum oil and also purifies it. The purifying is accomplished essentially by the adsorptive material which adsorbs the impurities therefrom. Acid, as previously explained, is only used upon certain types of oil and in any case is only used in a very small amount, generally less than 1%. Even when acid is used, it is not necessary to subsequently treat the oil for neutralization since the acid is adsorbed by the adsorptive material, leaving the oil in a neutral condition. In conducting my process fresh adsorptive material, which is acid treated clay, is used in the secondary still 4. This adsorptive material is separated from the oil in the secondary filter press 6, at this time carrying a small amount of impurities and acid and is considered spent adsorptive material. I desire for the purpose of economy to use this once used or spent acid treated clay for the first treatment of the oil in the primary still 1. It should be understood, however, that this is not necessary and that fresh adsorptive material may be used in both instances.

The economy of the process of my invention is one of its foremost features. The oil is rapidly treated and there is but very small waste. There is no sludge formed. The cost of my process is a considerable saving over the present processes in which the sludge ranges from 5 to 30%. By accomplishing a fractionation and purification of the oil simultaneously, the final products of the oil are more quickly produced, thus saving considerable time and contributing to economy.

I claim as my invention:

1. A process of treating petroleum oils comprising: mixing an oil with a previously used adsorptive clay in the presence of a high vacuum, said adsorptive clay adsorbing a large percentage of the impurities of said oil; heating said oil and passing steam therethrough during said mixing in order to distill light constituents therefrom; filtering said oil from said adsorptive material carrying said impurities; mixing said filtered oil with a fresh second adsorptive clay in the presence of a high vacuum to adsorb the remaining impurities of said filtered oil; heating the second mixture and passing steam therethrough in order to evaporate the remaining light constituents of said filtered oil and reduce same to a desired viscosity; and filtering said second mixture to separate the residual filtered oil from said second adsorptive clay.

2. A process of treating petroleum oils comprising: mixing an oil with an adsorptive clay previously used in the second adsorptive step of this process in the presence of a high vacuum, said adsorptive clay adsorbing a large percentage of the impurities of said oil; heating said oil and passing steam therethrough during said mixing in order to distill light constituents therefrom; filtering said oil from said adsorptive clay carrying said impurities; mixing said filtered oil with a fresh second adsorptive clay in the presence of a high vacuum to adsorb the remaining impurities of said filtered oil; heating the second mixture and passing steam therethrough in order to evaporate the remaining light constituents of said filtered oil and reduce same to a desired viscosity; and filtering said second mixture to separate said filtered oil from said second adsorptive clay and condensing the vapors resulting from the steam treatment for the purpose of reclaiming the distilled constituents of said oil.

3. A process of treating petroleum oils comprising: mixing an oil with an adsorptive clay previously used in the second adsorptive step of this process and sulphuric acid in the presence of a high vacuum, said adsorptive clay adsorbing a large percentage of the impurities of said oil; heating said oil and passing steam therethrough during said mixing in order to distill light constitutents therefrom; filtering residual oil from said adsorptive clay carrying said impurities; mixing said filtered oil with a fresh second adsorptive clay in the presence of a high vacuum to adsorb the remaining impurities of said filtered oil; heating the second mixture and passing steam therethrough in order to evaporate the remaining light constituents of the residual filtered oil and reduce same to a desired viscosity; and filtering said second mixture to separate said filtered oil from said second adsorptive clay.

4. A process of treating petroleum oils comprising: mixing an oil with an adsorptive clay previously used in the second adsorptive step of this process and sulphuric acid in the presence of a high vacuum, said adsorptive clay adsorbing a large percentage of the impurities of said oil; heating said oil and passing steam therethrough during said mixing in order to distill light constituents therefrom; filtering said oil from said adsorptive clay carrying said impurities; mixing said filtered oil with a fresh second adsorptive clay in the presence of a high vacuum to adsorb the remaining impurities of said filtered oil; heating the second mixture and passing steam therethrough in order to evaporate the remaining light constituents of the residual filtered oil and reduce same to a desired viscosity; and filtering said second mixture to separate the residual filtered oil from said second adsorptive clay and condensing the vapors resulting from the steam treatment for the purpose of reclaiming the distilled contituents of said oil.

5. A process of treating petroleum oils comprising: mixing an oil with an adsorptive clay previously used in the second adsorptive step of this process and sulphuric acid in the presence of a high vacuum, said adsorptive clay adsorbing a large percentage of the impurities of said oil; heating said oil and passing steam therethrough during said mixing in order to distill light constituents therefrom; filtering the residual oil from said adsorptive clay carrying said impurities; mixing said filtered oil with a fresh second adsorptive clay and a second dose of sulphuric acid in the presence of a high vacuum to adsorb the remaining impurities of said filtered oil; heating the second mixture and passing steam therethrough in order to evaporate the remaining light constituents of the residual filtered oil and reduce same to a desired viscosity; and filtering said second mixture to separate the residual filtered oil from said second adsorptive clay.

6. A process of treating petroleum oils comprising: mixing an oil with an adsorptive clay previously used in the second adsorptive step of this process and sulphuric acid in the presence of a high vacuum, said adsorptive clay adsorbing a large percentage of the impurities of said oil; heating said oil and passing steam therethrough during said mixing in order to distill light constituents therefrom; filtering the residual oil from said adsorptive clay carrying said impurities; mixing said filtered oil with a fresh second adsorptive clay and a second dose of sulphuric acid in the presence of a high vacuum to adsorb the remaining impurities of said filtered oil; heating the second mixture and passing steam therethrough in order to evaporate the remaining light constituents of said filtered oil and reduce same to a desired viscosity; and filtering said second mixture to separate residual filtered oil from said second adsorptive clay and condensing the vapors resulting from the steam treatment for the purpose of reclaiming the distilled light constituents of said oil.

7. A process as defined in claim 1 including the step of cooling in the presence of a high vacuum the oil filtered from said second adsorptive clay.

8. A process as defined in claim 1 in which said first adsorptive clay is a spent activated clay and in which said second adsorptive clay is a fresh activated clay.

In testimony whereof, I have hereunto set my hand at Los Angeles, California, this 5th day of October, 1926.

WALTER S. BAYLIS.